(12) United States Patent
Murti et al.

(10) Patent No.: US 12,229,019 B2
(45) Date of Patent: Feb. 18, 2025

(54) VISUAL MAPPING OF PROTECTION STATUS FOR NETWORKING DEVICES

(71) Applicant: EMC IP Holding Company LLC, Hopkinton, MA (US)

(72) Inventors: Arun Murti, Mission Viejo, CA (US); Adam Brenner, Mission Viejo, CA (US); Mark Malamut, Aliso Viejo, CA (US); Vijay Anand, Irvine, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 518 days.

(21) Appl. No.: 17/710,814

(22) Filed: Mar. 31, 2022

(65) Prior Publication Data

US 2022/0229738 A1  Jul. 21, 2022

Related U.S. Application Data

(63) Continuation-in-part of application No. 16/912,512, filed on Jun. 25, 2020, now Pat. No. 11,709,967.

(51) Int. Cl.
G06F 11/14    (2006.01)
G06F 3/04817  (2022.01)

(52) U.S. Cl.
CPC ...... *G06F 11/1464* (2013.01); *G06F 11/1461* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 6,570,592 B1 * | 5/2003 | Sajdak | G01R 31/3177 345/440.1 |
| 8,966,318 B1 * | 2/2015 | Shah | G06F 11/3664 714/28 |
| 9,477,693 B1 | 10/2016 | Bachu | |
| 10,397,013 B1 * | 8/2019 | Hill | H04L 12/281 |
| 10,862,749 B1 | 12/2020 | Kiyak | |
| 2002/0194535 A1 | 12/2002 | Largman | |
| 2010/0115074 A1 | 5/2010 | Tapiola | |
| 2012/0143827 A1 * | 6/2012 | Brown | G06F 11/1469 707/654 |
| 2018/0351788 A1 | 12/2018 | Tammana | |
| 2019/0332495 A1 | 3/2019 | Fair | |
| 2019/0334909 A1 | 10/2019 | Schmitt | |
| 2019/0342258 A1 | 11/2019 | Raj | |
| 2020/0019471 A1 * | 1/2020 | Natanzon | G06F 11/1469 |
| 2020/0110675 A1 | 4/2020 | Wang | |
| 2020/0116485 A1 | 4/2020 | Melton | |
| 2020/0133781 A1 * | 4/2020 | Reddy Av | G06F 11/1469 |

(Continued)

*Primary Examiner* — Toan H Vu
(74) *Attorney, Agent, or Firm* — Staniford Tomita LLP

(57) ABSTRACT

Embodiments are described for a method and system of applying data protection software mechanisms to network devices to auto-discover the networking equipment, save changes from memory (TCAM) to local storage, backup changes to protection storage, provide auditing and tracking history of changes, and provide the ability to deploy test/development copies of changes using software defined networking techniques. Embodiments include an efficient visual mapping aspect provided through a GUI to display the topography and backup/protection configuration of network devices in a system.

20 Claims, 10 Drawing Sheets

(56) References Cited

U.S. PATENT DOCUMENTS

| | | |
|---|---|---|
| 2020/0351152 A1 | 11/2020 | Vidal |
| 2021/0075689 A1 | 3/2021 | Ramanathan |
| 2021/0232461 A1* | 7/2021 | Calmon .............. G06F 11/1464 |
| 2022/0188195 A1* | 6/2022 | Brenner .............. G06F 11/1448 |

* cited by examiner

| INFORMATION COLLECTED | USE IN USER INTERFACE |
|---|---|
| • MAC Address<br>• Display Name | MAC Address uniquely identifies a device, while Display Name is shown to end users |
| • Geographic Location (GPS or tags)<br>• Time Zone | Longitudinal and Latitudinal Positioning |
| • Connected Networks<br>• Static Routes<br>• Routing Information<br>• Peers/Neighbors<br>• VLAN Information | Determines which devices are connected to and accessible from others |
| • Link Speed<br>• MTU | Determines relative thickness of lines connecting devices |
| • Used/Total Bandwidth<br>• Latency | Determines color of lines connecting devices |
| • Hardware Sensor Data<br>• Software Version | Shows health of device |

FIG. 10

VISUAL MAPPING OF PROTECTION STATUS FOR NETWORKING DEVICES

CROSS-REFERENCE TO RELATED APPLICATIONS

The present application is a Continuation-In-Part application and claims priority to U.S. patent application Ser. No. 16/912,512 filed on Jun. 25, 2020, entitled "Data Protection for Networking Devices," and assigned to the assignee of the present application.

TECHNICAL FIELD

This invention relates generally to networking equipment and graphical user interfaces, and more specifically to visually mapping network topographies and protection status.

BACKGROUND OF THE INVENTION

Networking equipment such as managed switches, core routers and firewall devices have important configuration data that is stored on each device. These configurations include network (e.g., VLAN) tags, per port activation/link speed, domain routing protocol (e.g., BGP/OSPF) settings, firewall rules, high availability/redundancy settings, and so on, and are generally critical to running a network. Most network equipment have a two phase commit process that must be followed for all changes. The first phase is to commit the settings to memory (typically ternary content addressable memory, TCAM) and the second phase is to save the changes to local persistent storage such that all settings are applied on power loss/reboot.

In a large network, the number of network equipment (infrastructure) devices could number in the thousands and be spread across multiple geographic locations. Moreover, such devices could be physical or virtual. There are several challenges customers and network operators face with regard to maintaining the configuration of such devices. These include: forgetting to commit changes to local persistent storage, needing to manually replicate changes to external systems in the event of unit malfunction/replacement, a lack of audit and history tracking, and lack of test/development use case enablement, among other similar issues.

Efficiently displaying network topographies and backup configuration and protection status for devices in complex networks is important to ease system setup and configuration tasks. Present systems typically provide this kind of information in the form of numeric or text lists as raw database or spreadsheet information. Such information can be difficult to navigate and interpret and lead to increased setup and configuration costs.

What is needed, therefore, is a network management system that facilitates the storage and implementation of configuration and setting data for network equipment devices, and that provides an efficient graphical representation of the operation and protection settings for these devices.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, Data Domain Boost, and Avamar are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 10 is a table that shows information collected from DPND for use in the visual mapping GUI, under some embodiments.

DETAILED DESCRIPTION

Figure 1:
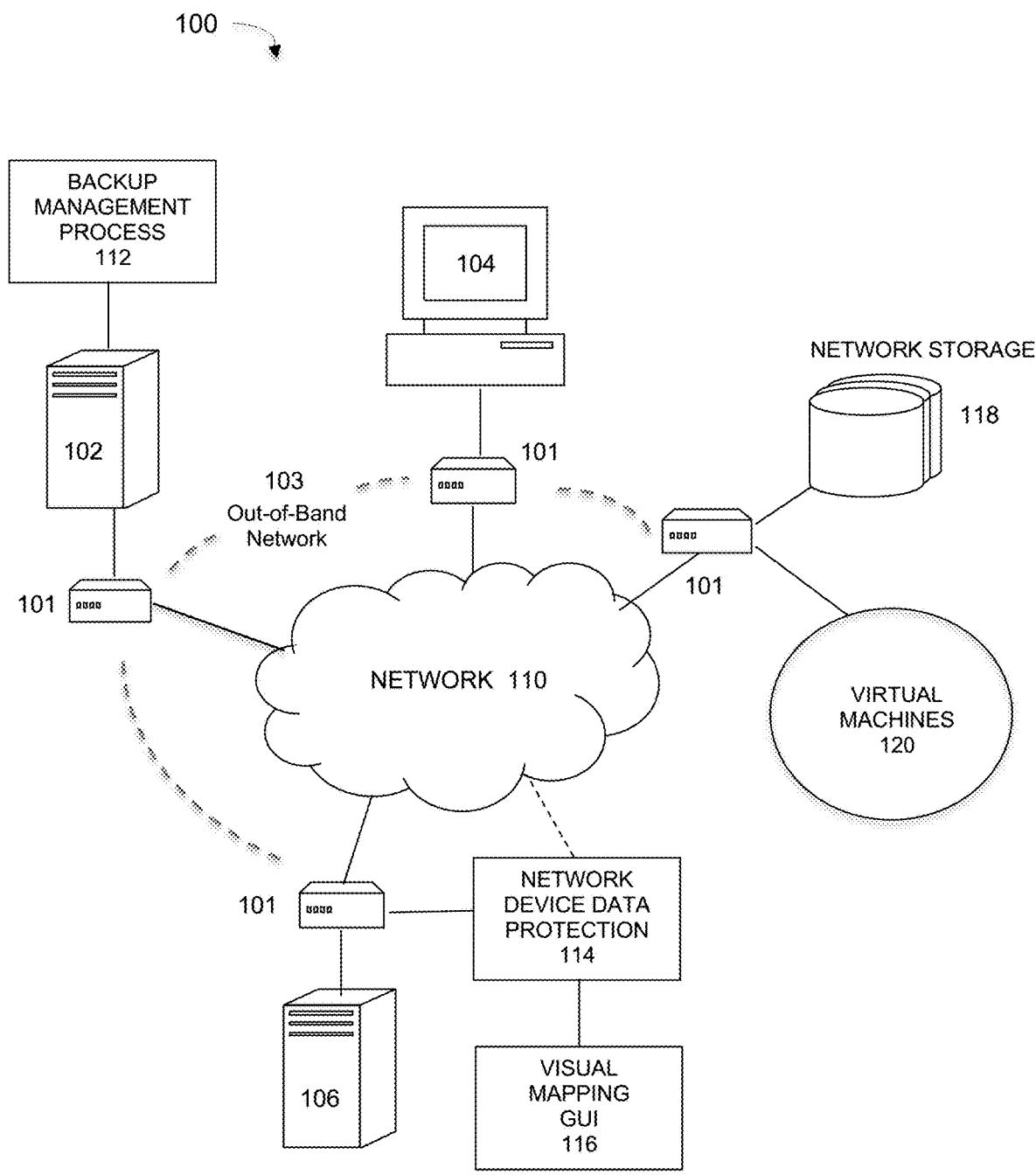
FIG. 1 illustrates a computer network system that applies data protection mechanisms to out-of-band network equipment devices with a visual mapping GUI, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a method and system of applying data protection software mechanisms to network equipment devices to auto-discover the networking equipment, save changes from memory (TCAM) to local storage, backup changes to protection storage, provide auditing and tracking history of changes, and provide the ability to deploy test/development copies of changes using software defined networking techniques. Embodiments are further described for graphical user interface (GUI) mechanisms for visually mapping and displaying configuration settings for the network equipment devices in complex networks.

FIG. 1 illustrates a computer network system that applies data protection mechanisms to out-of-band network equipment devices, under some embodiments. For network 100, a number of network resources, such as server computers 102, 106, desktop or portable computers 104, storage devices 118, and other similar system resources.

For the embodiment of FIG. 1, at least one server 102 may be a backup and/or storage server that executes a data storage or backup management process 112 that coordinates or manages the backup of data from one or more data sources to storage devices, such as network storage 118, client storage, and/or virtual storage devices 120. With regard to virtual storage, any number of virtual machines (VMs) or groups of VMs (e.g., organized into virtual centers) 120 may be provided to serve as backup targets. The VMs or other network storage devices serve as target storage devices for data backed up from one or more data sources, such as storage server 102 or other data source, in the network environment. The data sourced by the data source may be any appropriate data, such as database data that is part of a database management system, and the data may reside on one or more hard drives for the database(s) in a variety of formats.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 118, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The network server computers are coupled directly or indirectly to each other and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

For the embodiment of FIG. 1, each computer, storage device, or other resource is connected to network 110 or other resources through some sort of network equipment or interface device 101. Such as device may be switch, router, modem, load balancer, buffer, or some other similar device that conditions the data or otherwise facilitates interface of the computer (e.g., 102, 104, 106) with the network 110. The interface may be embodied as an external device, or it may be at least partially integrated with the computer itself.

In an embodiment, the network equipment devices 101 are part of an out-of-band network 103, which is an abstraction of the actual network connectivity among these devices to show that they are subject to out-of-band management protocols that involve the use of management interfaces or serial ports for managing and connecting this equipment.

Such out-of-band management usually involves the use of a dedicated management channel for device maintenance. It allows a system administrator to monitor and manage servers and other network-attached equipment by remote control regardless of whether the machine is powered on, or whether an operating system is installed or functional, and is in contrast to in-band management that involves simply connecting to a switch using normal network connectivity. Out-of-band management allows the network operator to establish trust boundaries in accessing the management function to apply it to network resources, and to ensure management connectivity.

In system 100, the out-of-band devices 101 are characterized in that they are not on the same network as the rest of the data protection computer (e.g., 102) and media devices (e.g., 118). Though some of the hardware cabling and wiring infrastructure may be the same, they generally use different network systems and protocols. The network equipment devices 101 can also have unconventional access programmatical interfaces (e.g., Telnet or SSH), and they also have a unique process of committing items from memory to local storage as part of user operations. Consequently, and as stated above, certain issues are associated with managing both out-of-band and in-band network devices, such as failing to commit changes to local persistent storage, needing to manually replicate changes to external systems, and lack of audit/history tracking and test/development use case enablement.

Whereas data protection methods utilized by the computer and storage devices of FIG. 1 utilize certain data protection techniques that efficiently protect and restore data of filesystems (e.g., laptop/desktop), NAS devices, virtual machines and applications such as databases, such methods are not accessible by the network equipment in present, known systems. For system 100 of FIG. 1, one or more embodiments of a network device data protection process 114 apply certain data protection processes to the maintenance of network equipment devices 101. Embodiments of process 114 essentially apply application-consistent backup techniques, like databases, to network equipment devices 101. Such devices are unique in that a majority of them have a two-phase "commit" function. Unlike regular applications that are protected, network devices do not have the same interface or even data path that use normal workflows. Network devices are controlled via an out-of-band management network 103 that requires a different architecture than currently provided in present systems. Embodiments of the network device data protection process 114 can discover network devices on the network, assign policies to those network devices and then protect those devices; it also enables other use cases like audit tracking and copy reuse.

In an embodiment, process 114 provides a new set of software called data protection networking device (DPND), that is responsible for backing up and restoring configuration changes for all network devices 101. Other functionality such as audit tracking and test/development copies will be integrated at the protection software. It should be noted that process 114 may be provided as an executable software routine, hardware component, or other module that is provided with or as part of one or each interface device 101, or as a network 110 or cloud-based process. The DPND functionality can be provided as the network device data protection process 114 as a component (e.g., hardware or firmware) or as an executable program executed in network 110 or as part of any device 101 or computer 106 of system 100.

In an embodiment, network devices 101 (also referred to as "network equipment" or "network equipment device" or "network interface devices") can be considered any of the following: managed switches, core routers, firewalls, load balancers, and so on. For the purpose of description, embodiments will be generally described with respect to managed switches, however it should be noted that embodiments are not so limited and may include any type of network equipment, interface, or infrastructure device.

When a network device is first deployed or installed, it typically has what is referred to as a "day 0 configuration," which are default settings for the device set by the manufacturer or vendor. As stated above, configuration parameters depend on the type of device, and can include parameters such as: network (e.g., VLAN) tags, per port activation/link speed, domain routing protocol (e.g., BGP/OSPF) settings, firewall rules, high availability/redundancy settings, and so on.

For a managed switch, such configuration parameters can be static routes, default port assignments, and so on. During the course of normal operation, such configuration parameters are changed with frequency that depends on network size, activity, scalability, topography, and so on. Heavily used or critical switches and routers may be regularly reconfigured with new port assignments, firewall settings, operating characteristics (e.g., voice, data, etc.), firmware upgrades, patches, bug fixes, and so on. These changes can be done either manually by a technician or system administrator, or they may be performed by an automated updating procedure that implements changes per a defined policy. For out-of-band devices, such changes are typically made while the devices are on the network and active. Embodiments facilitate the saving of configuration changes on these devices to persistent memory storage using data protection techniques instead of the simple out-of-band network protocols.

Figure 2:
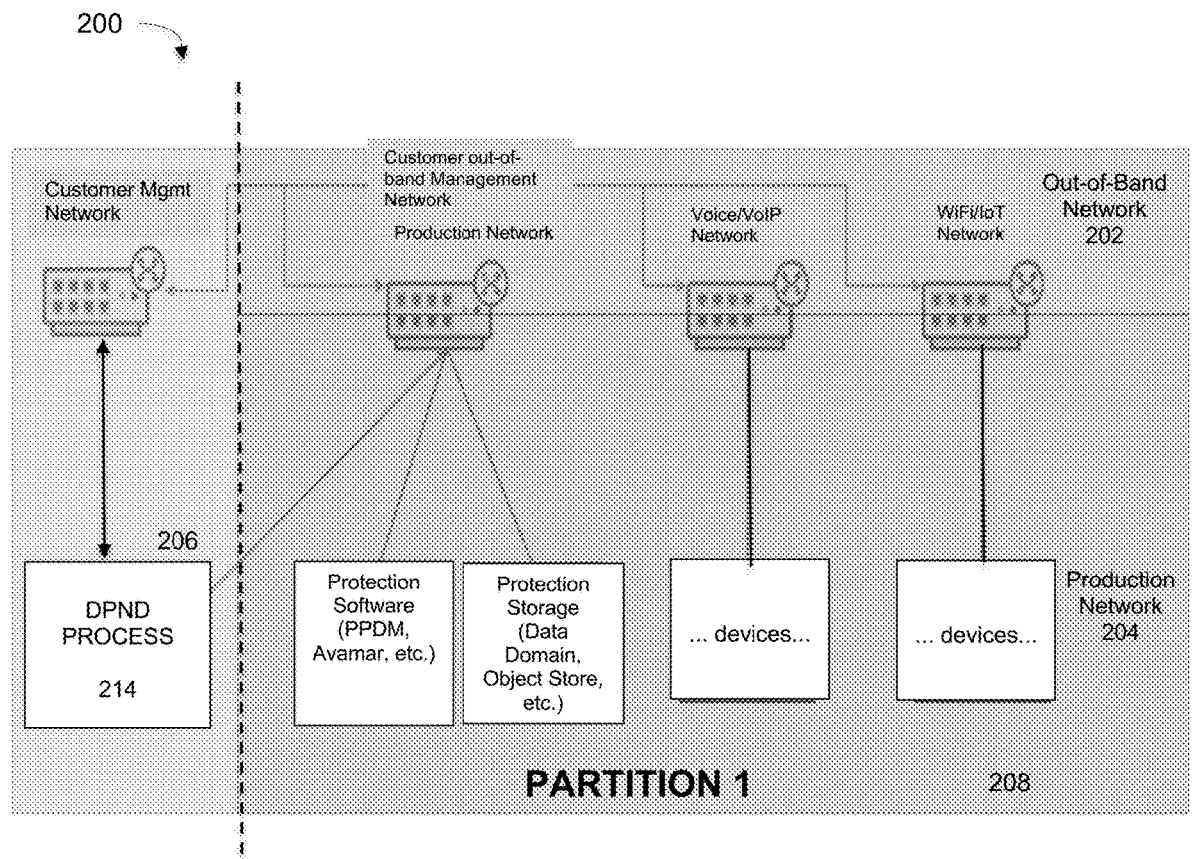
FIG. 2 illustrates an example user network that implements a data protection networking device process, under some embodiments.

FIG. 2 illustrates an example user network that implements a data protection networking device process, under some embodiments. System 200 represents a network comprising a number of user resources, such as production software, protection storage, client server computer, and devices in a production network 204. These resources are coupled to a network through network devices in out-of-band network 202, which is a secured and limited access network used to configure and monitor all network devices that is not accessible by the production network. Each network device (switch, router, firewall, etc.) has their management network port connected to the out-of-band network. The production network 204 is a series of networks that customers may sub-divide into. Three examples are shown for example as: production, Voice/VoIP and WiFi/IOT network, but embodiments are not so limited.

For the embodiment of FIG. 2, section 206 represents the network region where the DPND process 214 is installed. This is a dual-homed component or process in that it has access to both the out-of-band network 202 and the production network 204. Region 208 includes the resources and network devices that are managed by DPND process 214. The DPND process 214 may be deployed externally as a VM/physical device within the network or it could be embedded within one or more of the network devices. There may also be multiple instances of DPND in the customer network. The protection software and storage may be in the production network or in the out-of-band network, or it may even be hosted as a service. For purposes of description, DPND will be described as a single instance implementation that is dual homed (i.e., access to out-of-band and production network) and a local instance of protection software and storage, though embodiments are not so limited.

Each network device (e.g., managed switch, a firewall or router) usually has a different method for programmatic control. The traditional industry standard for such control has been Telnet, which is used to administer commands on devices through the use of command line interfaces (CLIs). Due to the insecurity of Telnet, best practices have led to network devices being put on restrictive 'management' networks, such as an out-of-band network. As security improved, other methods such as SSH (Secure Shell) and Rest APIs were added, but the practice of putting the management interface on an out-of-band network is still a viable solution.

Depending on the network device, model, version and the customer configuration, the DPND process is configured to support each of the following controlling interfaces: Telnet, SSH, ReST API, RestCONF, and vendor specific or similar protocols. In an embodiment, the DPND process supports a pluggable driver model which adds flexibility to handle a wide variety of network devices. Each driver will support a common set of use cases, such as: commit, backup, and restore operations.

Figure 3:
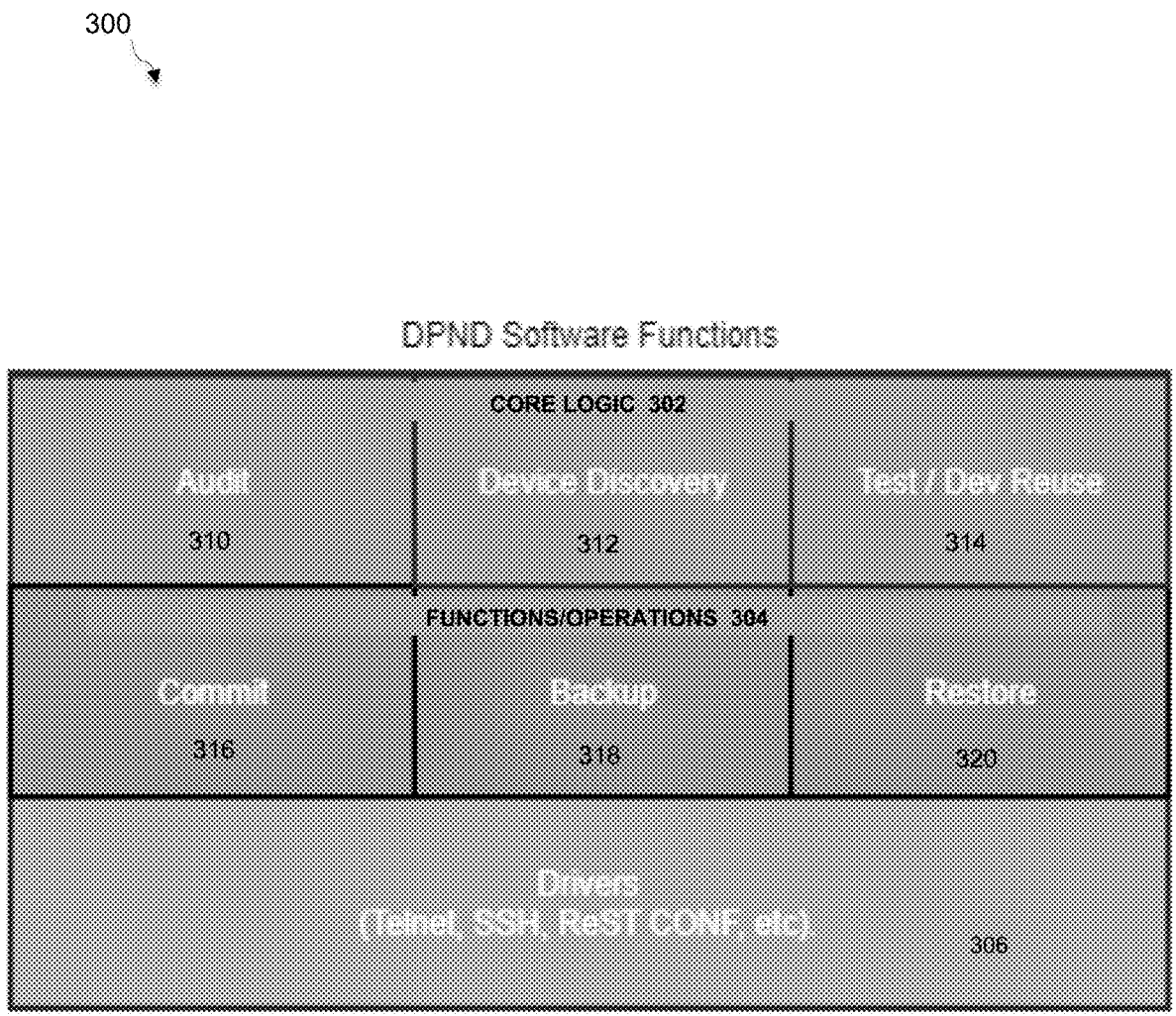
FIG. 3 is a sample driver model and implementation within the data protection networking device process software, under some embodiments.

FIG. 3 is a sample driver model and implementation within the DPND software, under some embodiments. The software model 300 of FIG. 3 comprises a core logic layer 302, a functions and operations layer 304 and a drivers layer 306. The drivers 306 represent drivers that support the interfaces listed above: Telnet, ReST, CONF, and so on. The functions/operations layer 304 comprise commit 316, backup 318, and restore 320 functions; and the core logic layer comprises certain applications such as audit 310, device discovery 312, and test/dev reuse 314, to be described in greater detail below.

Figure 4:
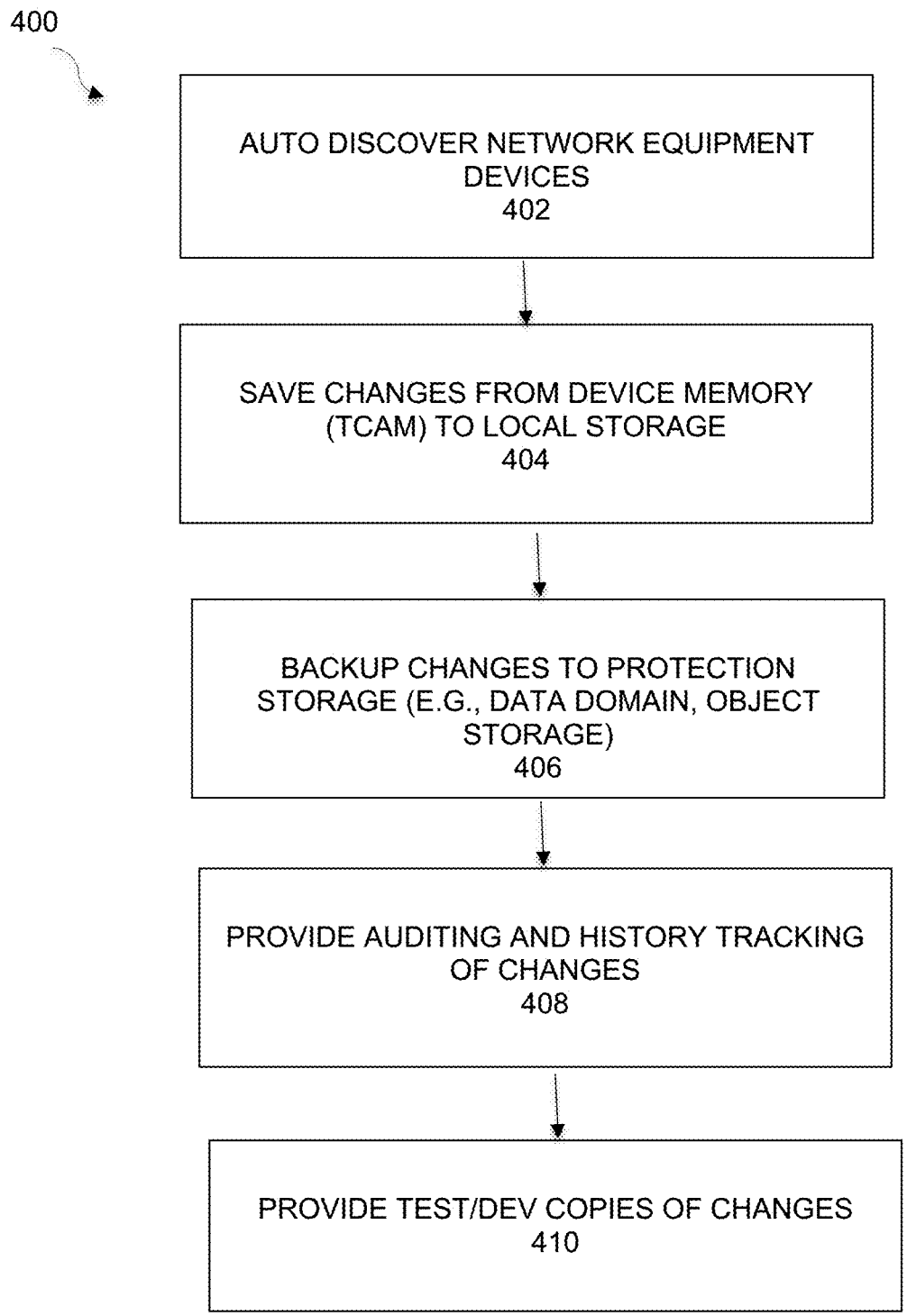
FIG. 4 is a flowchart that illustrates a method of network device data protection, under some embodiments.

FIG. 4 is a flowchart that illustrates a method of network device data protection, under some embodiments. As shown in FIG. 4, process 400 begins with auto-discovery of the network equipment devices in the network, 402. The changes for the discovered devices are then saved from their resident memory (e.g., TCAM) to local storage, 404. The changes are then backed up to protection storage, such as provided for normal data backup operations, 406. The process 400 also provides auditing and tracking history of changes, 408, and the ability to deploy test/development copies of changes using software defined networking techniques, 410. Detail regarding each of these processing steps will be provided in greater detail below.

Figure 5:
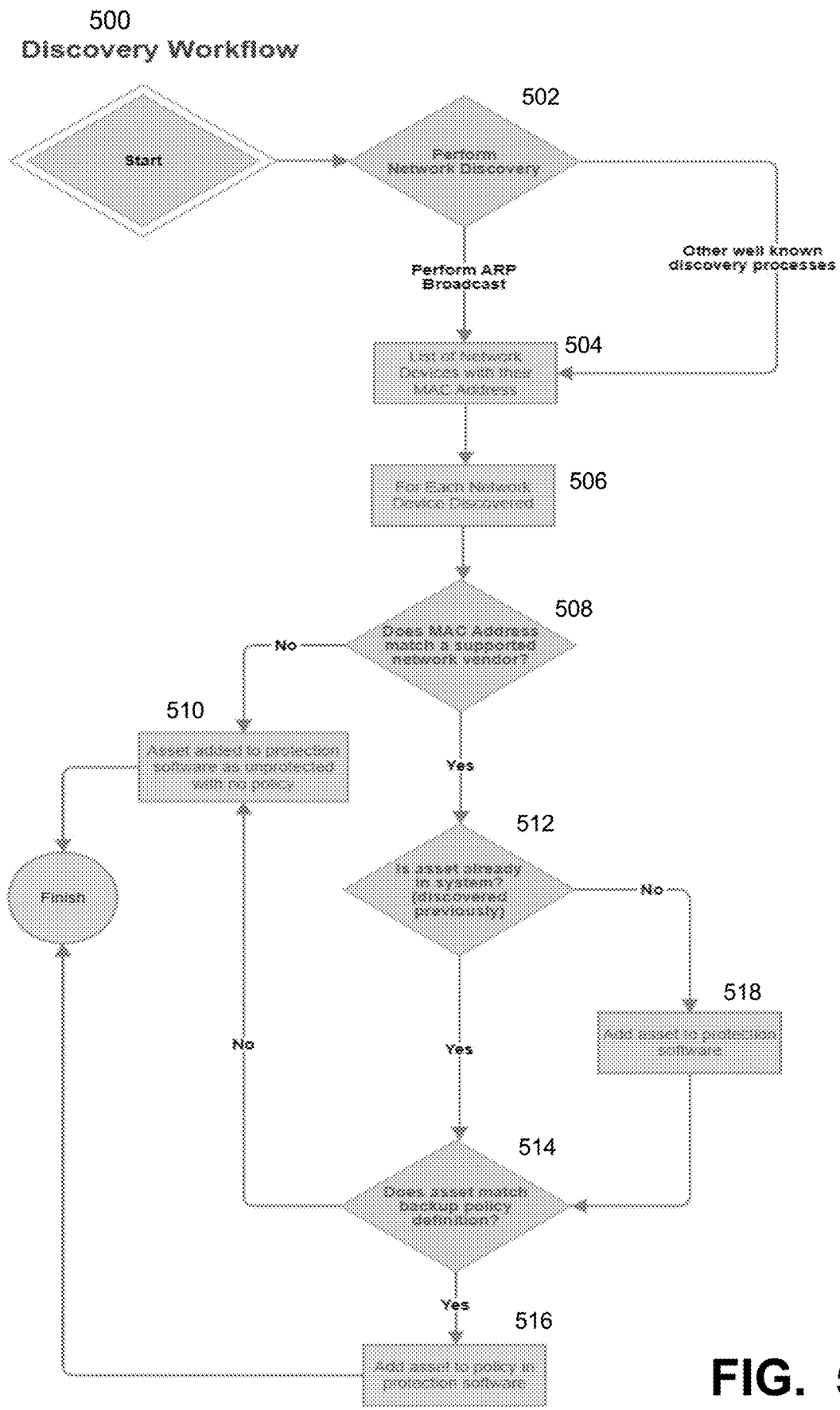
FIG. 5 is a flowchart illustrating a method of performing an auto-discovery process, under some embodiments.

As shown in FIG. 5, process 500 begins with auto discovery of network equipment devices, as well as policy assignment. Different methods of device discovery in networks currently exist. In an embodiment, the device discovery process uses an Address Resolution Protocol (ARP) broadcast method. In general, ARP is a communication protocol used for discovering link layer address (e.g., MAC address) of a given internet layer address for a device (e.g., IPv4 address). The ARP broadcast runs on the DPND process 214 of FIG. 2. The result of the ARP broadcast will be a list of MAC addresses and Internet Protocol (e.g., IPv4/IPv6) addresses for each network device discovered. In an embodiment, this discovery information is transmitted to the data protection software where it will used to populate a list of assets (network devices) to protect. Each asset can have policies applied to them that control how often to backup and how long data is archived.

Other discovery methods instead of ARP can also be used, such as Link Layer Discovery Protocol, Simple Service Discovery Protocol, Neighbor Discovery Protocol, or any other similar public or proprietary discovery protocol.

Each MAC (media access controller) address for every device manufactured worldwide is registered to a company as specified by IEEE Standards. Because of this worldwide requirement, the data protection software can determine, based on each MAC address, the identity of the vendor for the network device is and display it to the user. These vendors could include: Dell, Cisco, Fortigate, and so on. The vendor information can also be used as part of a policy definition. An example policy definition might be: all Dell switches should be protected every hour while every Cisco switch once a day. Table 1 below illustrates a sample table that could be populated by the DPDN process as part of its discovery operation, 502, under some embodiments.

TABLE 1

| MAC Address | IPv4/IPv6 Address | Vendor |
| --- | --- | --- |
| 00:00:97:00:00:00 | 10.255.255.21 | EMC |
| 00:06:5B:00:00:00 | 10.255.255.22 | Dell |
| 00:01:42:00:00:00 | 10.255.255.23 | Cisco |

FIG. 5 is a flowchart illustrating a method of performing an auto-discovery process, under some embodiments. Process 500 of FIG. 5 begins with initiation of the network discovery operation, 502. This can be implemented through either ARP broadcast techniques or other known discovery processes. The network discovery operation produces a list of network addresses and their respective MAC addresses 506. For each discovered network device 506, the process determines whether or not their MAC address matches a supported vendor, 508. If there is no match, the discovered network device is added as an asset to the data protection software as an unprotected device with no protection policy, 510. If, in step 508, it is determined that there is a match, the process next determines whether this device is already in the system as a previously discovered device, 512. If not, it is added as an asset to the data protection software 518. For previously discovered or newly discovered assets, the process then determines whether the asset matches a backup policy definition, 514. If it does match, the asset is added to the policy in the data protection software 516, and the process ends. If it does not match, the unmatched asset is added to the data protection software as an unprotected device with no policy, 510, before the process ends.

Once the discovery operation 500 is performed, the system has the following information: IP Address of Network Device and the MAC Address of the network device. With these two pieces of information, the process can figure out the device vendor (e.g., Cisco, Aruba, Arista, Dell, etc.) and map that to an existing or new protection policy. If there is additional discovery information, such as network switch OS version, open ports, and so on, these can be included as part of the decision making for policy matching.

In an embodiment, the protection policy for assets can be provided as a set of rules that specify various protection parameters for different vendors. Parameters can include elements such as protection period (e.g., hourly, daily, weekly, etc.), storage duration (e.g., one month, one year, etc.), protection storage device, and so on. Table 2 below illustrates a sample policy table that could be used for protection of assets based on device vendor, under some embodiments.

TABLE 2

| Vendor | Protection Period | Storage Duration | Protection Storage |
| --- | --- | --- | --- |
| EMC | Hourly | One Year | SSD Only |
| Dell | Hourly | Two Years | Virtual/HDD |
| Cisco | Daily | Two Years | Virtual/HDD |

In the above example of Table 2, the protection storage parameter could imply how fast a recovery is provided. For the example shown, the EMC devices are stored on SSD rather than HDD drives as the time to recover on SSD would be faster than HDD. Other parameters could also specify that the protection storage is on deduplication media or cloud/object based. In addition, there may be a selection of different inputs or IP addresses, rather than vendor. For example: all network devices on 10.255.255.0/24 could be protected on an hourly basis, stored for one year and stored on HDD; while all network devices on 10.10.10.0/24 could have a daily protection period, are stored for two years on virtual media, and so on. In general, any attribute that the discovery policy finds or discovers can be used to help drive and categorize the network device protection policies, and any appropriate number of parameters and associated protection policy rules can be implemented.

The DPND process 214 protects each network device that has been automatically discovered and added as an asset in the system. In an embodiment, the DPND process has the following unique capabilities: (1) communicating with each network device using a driver module (e.g., module 300); (2) saving and backing up the changes; (3) restoring the configuration to each device as needed; (4) audit and history tracking; and (5) enabling test/development copies.

With respect to the commit function for each driver, network devices typically have a two phase commit process. Such that changes on the network are first committed to resident memory of the network device, and then to local persistent storage of the network device. The resident memory is typically implemented as ternary content-addressable memory (TCAM). TCAM is a high-speed memory that stores data using three different inputs: 0, 1, and X to facilitate content searches in a single clock cycle. It is generally much faster than RAM memory, and is used in networking equipment to increase the speed of route lookups, packet classification and forwarding, and so on. During normal operation, changes made to the TCAM are live and applied to the network device. However if the network device reboots or loses power, any configuration in the TCAM is lost. The purpose of the commit function 316 for each driver is to save all configuration items from TCAM to the local persistent storage of the network device. Upon a reboot/power loss, the changes will be loaded from local persistent storage back to the device and thus will not be lost.

An example CLI command used to save the TCAM to local storage can be expressed as follows:

Sample save TCAM to local persistent storage:
$ configure
$ (configure): configuration copy running startup
$ (configure): configuration save running backup.xml While the sample command above uses the keyword "copy" and "save," the standard nomenclature considers this to be a commit. That is, committing all the live configurations to TCAM memory. For network devices that do not support the commit functionality, the DPND process will skip/ignore commit requests.

Once configuration changes are saved from TCAM to the network device local persistent storage, it is important to protect the configuration file and store a copy on protection storage. The purpose of the backup function 318 is to copy the local configuration file from the network device onto protection storage. The method of transporting the configuration file will vary depending on the protection storage. For example, if the protection storage is Data Domain, DPND might use DDBoost. If the protection storage is object storage from AWS, DPND might use an S3 library, and so on. The protection storage might offer unique capabilities like deduplication, encryption, and/or compression and DPND may use those capabilities.

The DPND process acts as a proxy or man in the middle, between the network device and the protection storage. Such a 3-way (man in the middle) solution comprises implementing the DPND process or component running or placed in between the network device and the protection storage. For this implementation, DPND is run outside the source on its own standalone machine. In an example system embodiment, the source (network device) is box 1, the proxy/man in the middle where DPND runs is box 2, and the protection storage (e.g., DataDomain, AWS object storage) is box 3. Alternatively, DPND can run inside the source (i.e., network device) which is more of a direct to storage model, or client-server model. The outside implementation is illustrated in FIGS. 6A and 6B with the DPND component/process functionally disposed between the network device and the protection storage.

Figure 6A:
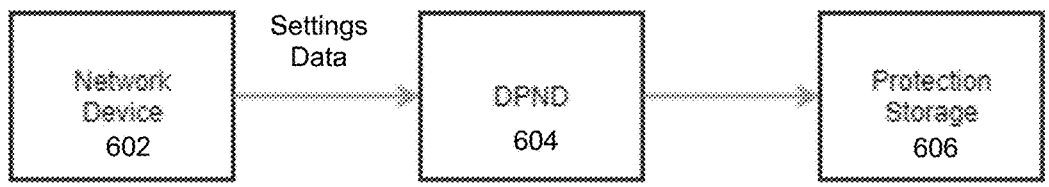
FIG. 6A is an example data flow diagram of the DPND backup function, under some embodiments.
Figure 6B:
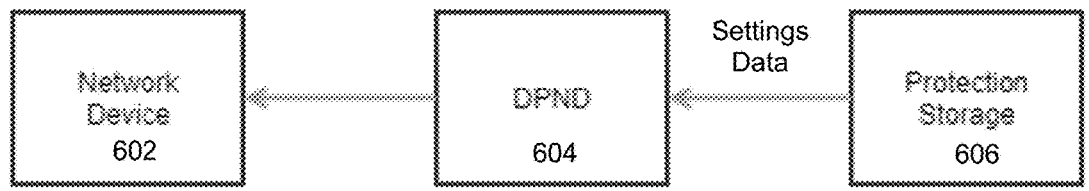
FIG. 6B is an example data flow diagram of the DPND restore function, under some embodiments.

FIG. 6A is an example data flow diagram of the DPND backup function, under some embodiments. For the backup function, the DPND process 604 is functionally coupled between the network device 602 and protection storage 606 and facilitates the copying of setting data from the network device (from its TCAM memory) to the protection storage.

In an embodiment, the DPND process 214 relies on data protection software within the system to perform orchestration of the backup. Thus, with reference to system 100 of FIG. 1, DPND process 114 uses the backup server 102 and backup management process 112 to perform the backup function. Alternatively, DPND could perform this functionality itself. This process may include providing schedules and retention periods, for example.

The restore function 320 replaces the existing configuration that was backed up from the network device back to the local persistent storage of the network device. Once configuration is placed, the restore command will provide an option to apply those settings to the live system. In some cases, network operators may want to only restore the configuration file but not apply them so further modifications can be made. In other cases, network operators will want those changed applied after they are restored to the device. Some network devices may not have the two stage commit process in which DPND with the pluggable driver model 300 will be forced to apply the settings to the live system after restore.

FIG. 6B is an example data flow diagram of the DPND restore function, under some embodiments. For the restore function, like the backup function, the DPND process 604 acts as a proxy or man in the middle between the protection storage 606 and the network device 602. In this case, the settings data is transferred from the protection storage 606 to be copied to or restored back on the network device 602. The same features of deduplication, encryption, and/or compression may also apply. Likewise, for the restore function, the DPND process 114 might also rely on system-wise data protection software 112, or it may use its own functionality. When restoring configuration data, DPND can restore to the data to the same device or to a new device. For example, in a disaster recovery scenario, placing the configuration on a different device than the original network device may be required.

which is in human-readable plain text format. Parsers can then be used to understand and read this data.

Table 3 below illustrates a sample audit table for an audit database, under some embodiments.

TABLE 3

| DEVICE | CONFIGURATION | VALUE | BACKUP |
| --- | --- | --- | --- |
| 00-53-00-96-B7-41 | port 0 - VLAN | trunk | Monday Backup |
| 00-53-00-96-B7-41 | port 1 - VLAN | VLAN 10 | Monday Backup |
| 00-53-00-96-B7-41 | port 1 - VLAN | VLAN 200 | Tuesday Backup |
| 00-53-00-F3-A8-11 | port 20 - ACL | 20 permit IP 192.0.2.0/24 203.0.113.0 0.0.0.255 | Monday Backup |

As shown in FIG. 3, the DPND software functions diagram illustrate two additional pieces of core logic besides device discovery 312. These are the audit/tracking process 310 and the Test/Dev Reuse process 314.

With respect to audit and history tracking, due to the limited amount of system resources (CPU, Memory and Storage) found on network devices, advanced features such as tracking configuration changes or performing audit of changes in present known systems are limited or non-existent. If these system resources run out, this could cause the network device to crash and be unable to perform further management, or to operate in a degraded state. For this reason, audit and tracking features are often turned off or disabled to save network resource and thereby avoid potential network issues. In this case, a useful feature with regard to analyzing past system behavior is lost.

In an embodiment, the DPND function 300 includes an audit and history tracking process 310 that provides audit and tracking as part of its normal backup operations. If a user defines a policy to schedule backups every hour and a change is made, DPND enables viewing the history of the changes through the standard user interface (UI) workflows that exist within the data protection software, such as Avamar or PowerProtect Data Manager.

The audit tracking process 310 works by recording an entry in the audit database after a backup occurs. This audit database can be stored within the DPND process or it can be embodied as metadata of the backup. Either way, it can be treated like any other metadata and might be stored in a metadata catalog within the backup software. For example, filesystem metadata includes filenames, sizes of files, a/m/c time, and so on. Similarly, network device information, such as per-port configurations, switch access control lists (ACLs), routes, and so on, would be tracked in the audit database. As new backups occur, the audit database keeps track of each previous entry, along with the new entry and compares the results. If the results are the same, no additional information is stored. If the results are different, then a new entry is recorded in the audit database. This would include the updated value of that record, any additional properties like the user/timestamp who made the change (if available), along with backup details (e.g., when the backup occurred, etc.).

Over time, the audit database will have a list of entries for each feature for the network device, and a change list (audit trail) of what changed and when. When network administrators decide to restore backups, they will have the ability to see if a certain feature is present in a particular backup, or if a different date/time should be selected for the restore operation. It should be noted that most network devices store the configuration in a plain text human-readable file. This is either in a vendor proprietary format or an open standard, In the above example of Table 3, the 'Device' column lists the unique address or identifier of the network device and can be an IP address, internal identifier, or MAC address, as shown. The 'Configuration' column is a small section of the configuration that is present in the audit table. For the example shown, the table specifies that for this switch, the port 0's VLAN information is provided, and Port 0 might have other information like ACLs or speed, and so on, which could be provided as separate entries in the table. The 'Value' column is the value for the point-in-time for that configuration entry. The 'Backup' column is backup in which the value exists. This could be a unique identifier that DPND or backup software creates. For example, the day of the week (Monday) is provided. However, other appropriate values may be used, such as time of day (e.g., 12:00 am), backup period (e.g., every hour), and so on. The format and content of Table 3 is provided for purposes of example only, and embodiments are not so limited. Any information, format, and content may be provided in an audit table as desired based on system configuration, constraints, and requirements.

With respect to the test/development reuse process 314, it is common for network operators to test out configuration in a lab or test environment before pushing changes to the actual production software product. These test environments can be physical or virtual with the use of Software Defined Networking (SDN). The DPND process 604 can facilitate these environments by restoring known states from a particular network device to an alternative device in the test network. With the DPND driver model, it could be extended to translate one backup format to another. For example, a backup of a Cisco device that can be restored to a RestCONF standard in SDN will enable data mobility via the backup software.

Figure 7:
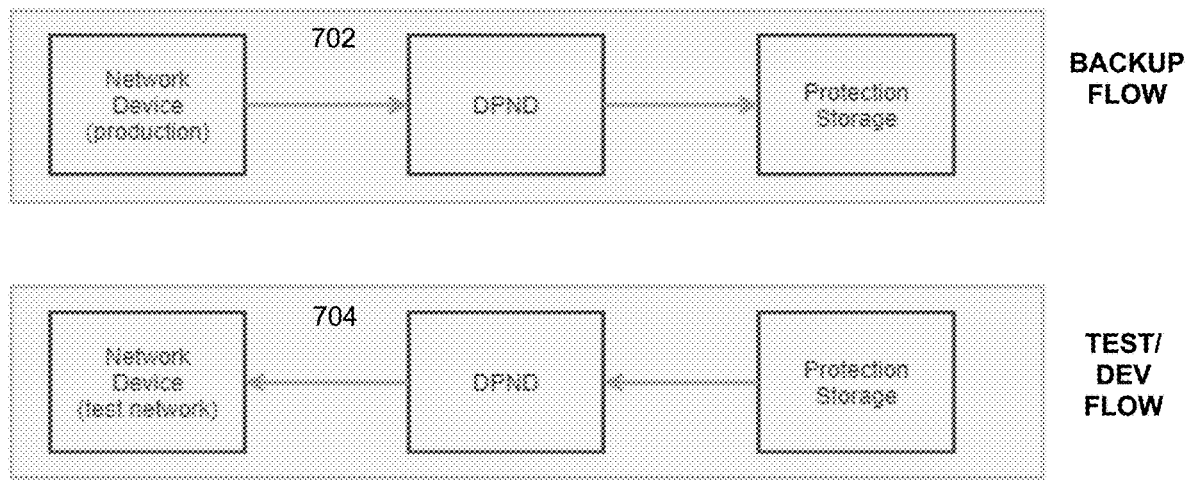
FIG. 7 is an example data flow diagram of the DPND test/development function, under some embodiments.

FIG. 7 is an example data flow diagram of the DPND test/development function, under some embodiments. This process comprises a backup flow 702 where the settings data is moved from the production network device through the DPND to the protection storage. The test/development flow 704 is the same as the restore data flow in that it goes from the protection storage back through the DPND to a network device. However, in this case, the target network device is different from the production network device the settings data was backed up from. Any appropriate target device can be selected, and it will be up to the network device to determine how to resolve any conflicts in different model versions.

In an embodiment, the test/development reuse process 314 is built on top of the audit function 310 in that restores can happen on a different network device than the one it was backed up from. The network administrator can choose to restore a backup to a different device, run the testing and make changes to that device, then back it up again. To push that configuration from a test/development environment to production, they can follow the same method of restoring the data, but this time to the production system rather than the test system. This solution is dependent on the vendor of the switch and backwards compatibility of configuration files. For example, if a user has the same make/model and device OS version in the production and test environment, then this would raise no problems. However, if any of these differ, it will be up to the user and vendor to fix any errors that might occur when doing the restore.

Visual Mapping

As described above, the DPND is software installed on devices such as managed switches and core routers, which enables backup and recovery of those devices in concert with Data Protection (DP) software such as PowerProtect Data Manager. This DP software depicts backups from those network devices as simply another set of assets amongst lists of other types of assets, such as VMs or filesystems, files/documents, and so on. In many present systems, useful data contained within these backups is not mined, and therefore cannot be used to provide further insights into the system. For example, backup or IT Administrators cannot easily leverage the information within the backups to optimize backup/replication policies based on the state of the network over time.

Embodiments of system 100 provide information to the user as simple lists backups of network devices through traditional means. As shown in FIG. 1, system 100 includes a GUI component 116 that visually maps the user's network and protection (e.g., backup status) applied to the devices in the system. Such a GUI is configured to provide a similar interface, such provided by a smartphone traffic map application, which shows how points along a journey are geospatially organized, the size and speed of the roads between them, the congestion along those roads, and so on. In many cases, a true map along these lines would be disadvantageous, as it could overwhelm users with information and require too much GUI manipulation (e.g., zooming in and out) to convey the right amount of information required by users.

Figure 8:
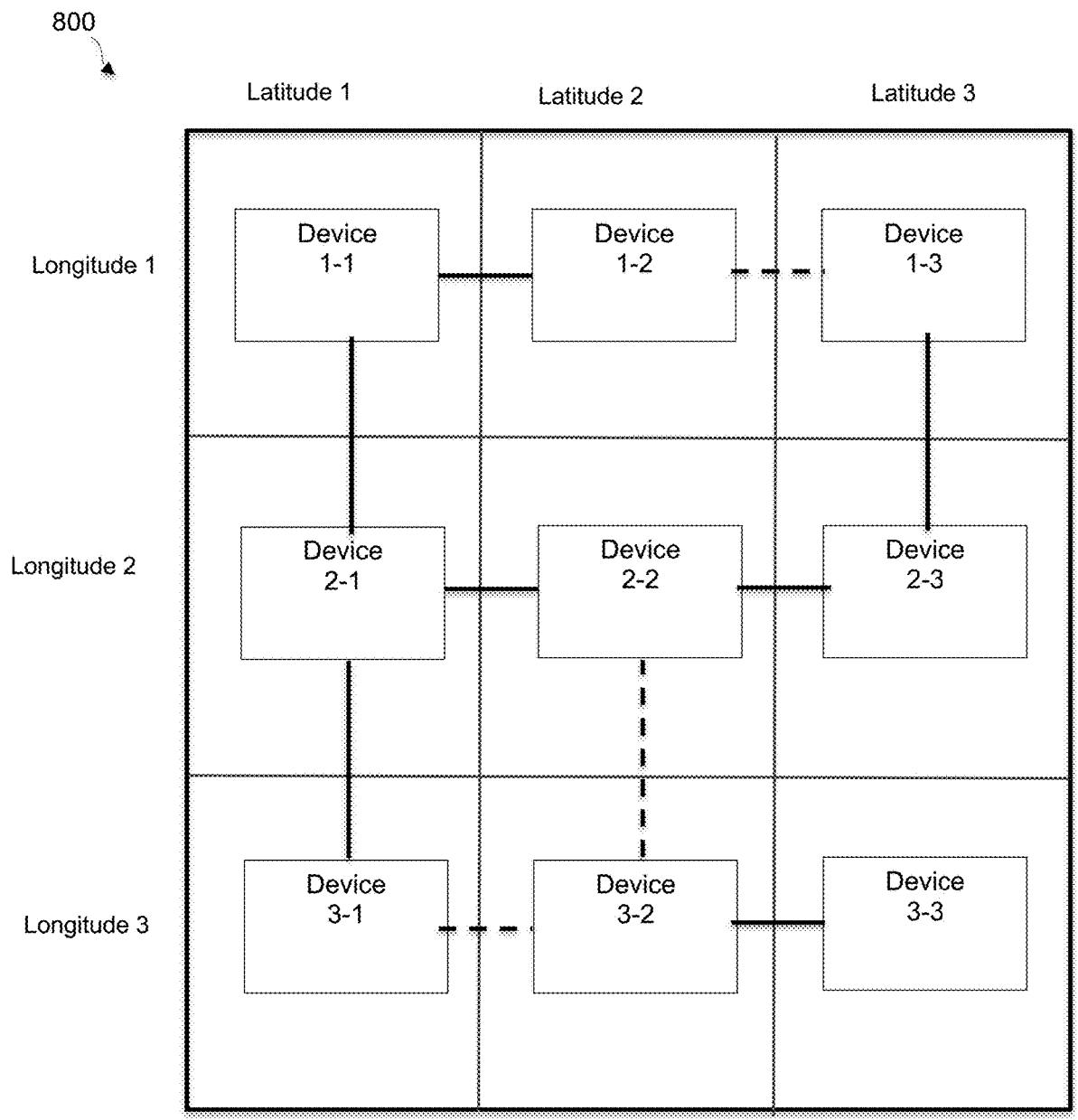
FIG. 8 illustrates an example visual mapping template, under some embodiments.

Embodiments include an efficient visual mapping aspect provided through a GUI to display the topography and backup/protection configuration and status of network devices in a system. In a high-level organization of the visual map, devices are organized into a table such that columns indicate longitudinal location and rows indicate latitudinal location. FIG. 8 illustrates an example visual mapping template, under some embodiments. As shown in a GUI display page a number of latitudes (e.g., 1-3 of n latitudes) is shown along an x-axis (rows) of table 800 and a number of longitudes (e.g., 1-3 of m longitudes) is shown along a y-axis (columns) of table 800. Each combination of latitude-longitude may contain one or more (or no) devices.

The latitude and longitude values may be selected to be of any appropriate scale depending on the network size and configuration. For example table 800 may illustrate devices in a global-scale, country-scale, or city-scale, and so on. It can also be used to represent devices in a smaller-scale network, such as a network in a building, where the longitude may represent floors in the building or devices in a rack, and so on. Any appropriate such scale may be used.

In an embodiment, a given topography illustrated by table 800 represents the state of the network at a specific point-in time. For a global-scale network, the columns may be based on time zones, or country-delineated longitudes. Based on display constraints, not all longitudes (or latitudes) need be displayed. For example, instead of showing a column for each possible time zone, only columns for time zones where devices are present are shown. In other embodiments, the columns may be based on different data, such as exact longitude. Within a given column, devices are ordered based on their geographic location from North to South. For simplicity, and based on display constraints, distances may or may not be represented by adding any gaps between the devices. That is, devices are represented relative to one another based on a given latitude-longitude array, and not to scale with respect to absolute distances. If feasible, some indication of distance may be provided tick marks showing distance counts (such as in miles, time zones, etc.).

One or more configuration display areas is associated with each device to provide further information with respect to device configuration, connectivity, performance, and so on. Such display areas may be provided using certain GUI techniques, such as pop-up windows, floating overlays, coded sub-windows, and so on. Lines or link elements may also be shown between the devices to represent actual or virtual connections as well as encode other information, such as distances, transmission rates, signal quality, and so on.

Figure 9:
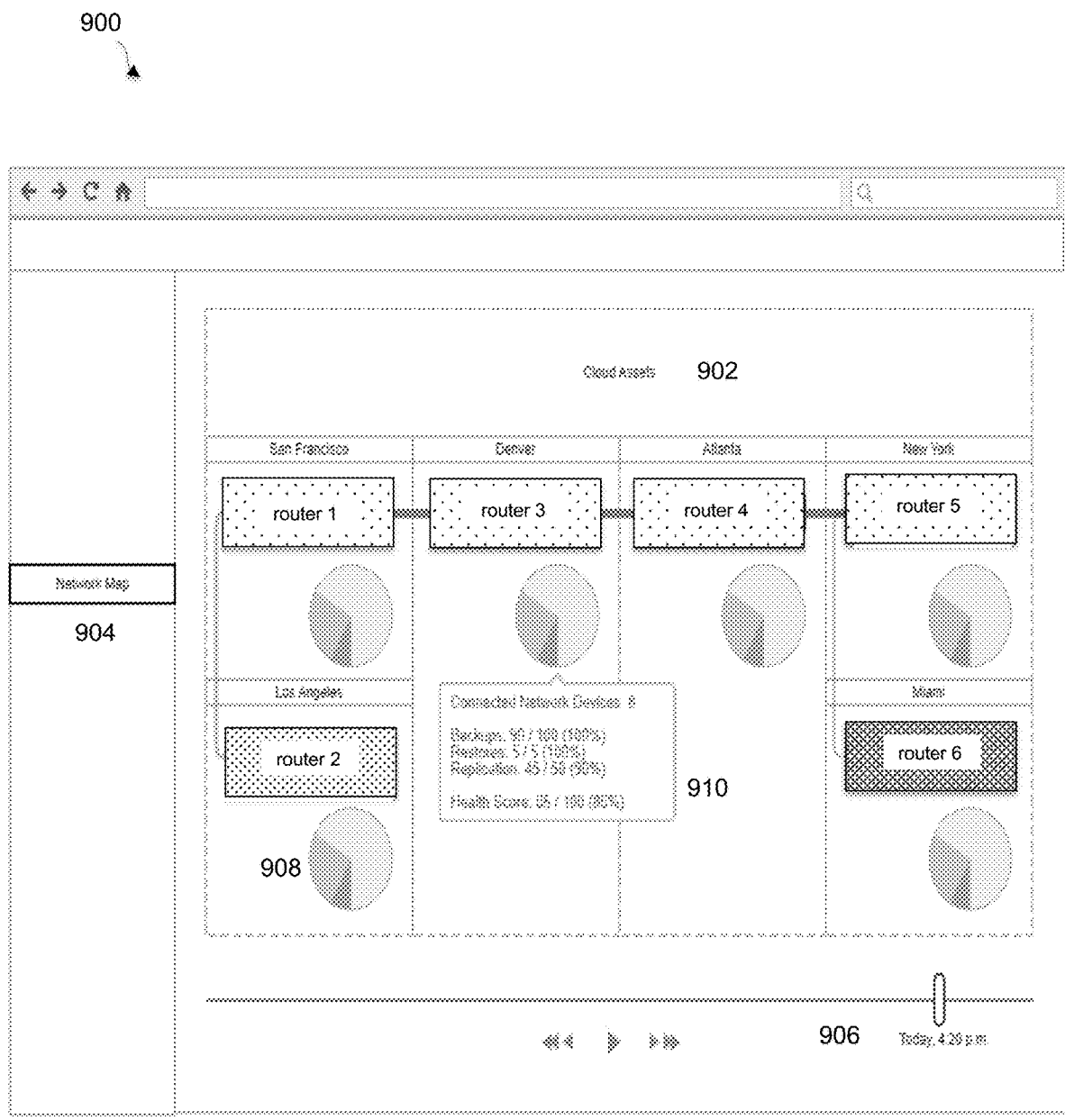
FIG. 9 illustrates an example GUI display page for efficient display of topography and backup/protection configuration of network devices in a system, under some embodiments.

FIG. 9 illustrates an example GUI display page for a visual mapping interface, under some embodiments. The example visual mapping table 900 of FIG. 9 illustrates cloud assets 902 comprising routers located in a number of North American cities. The example cities are San Francisco, Denver, Atlanta and New York, all displayed along a single first latitude row, and southern cities Los Angeles and Miami located in a second latitude row and in appropriate longitude columns, i.e., Los Angeles below San Francisco, and Miami below New York.

For the example of FIG. 9, each device is labeled with a header indicating its location (city) through device data gathered by the DPND or set manually by an administrator. The example label indicates the city of location, but other descriptive information may also be used, such as site or location name, address, GPS coordinate data, and so on.

The devices could be any device, set of devices, facility, and so on, depending on network scale and configuration. Devices in the public cloud (e.g., Amazon Web Services) can be simplified and shown at the top of the network map 904, with, for example, one column per cloud provider.

Device and configuration information is obtained for each device using DPND or simplified agent processes, as described above. While running the full DPND would not be allowed in a typical public/hyperscalar cloud, a simplified agent may be running to provide information about backup success rates, availability of components and cloud services (e.g., to detect outages).

With respect to the GUI mechanisms and display elements, certain per-device information is obtained for each device and represented in a visually distinguishing manner to allow for quick and easy identification of relevant operational characteristics. For the example of FIG. 9, devices are shown as rounded rectangles and color-coded or pattern-coded to show their own protection status with respect to immediately past backup operations. For example (and by default) device icons may be shown in certain colors or patterns to denote backup status, such as green (or clear pattern) for successfully backed up, yellow (or medium pattern hatching) for backed up with warnings, and red (or dense pattern hatching) for failed to back up. Other color or pattern schemes may be also be used to accommodate different display devices, user preferences/needs, and so on. Besides color or pattern, other visual indicators may be used to encode the device protection status, such as icon shape or other visual feature, such as highlights, blinking outline, and so on.

Connectors from one device to other devices is displayed to reflect the device connectivity characteristic through a visual representation of the connector. This connectivity characteristic can comprise any relevant parameter, such as link speed, maximum transmission unit (MTU) (i.e., the largest packet size that can be sent over the connection), device latency, and device bandwidth. Thus, links between devices can be shown with lines of different weights and colors such as thinner or thicker lines to indicate relative transmission speeds or signal quality, and so on. For clarity, rather than showing a 10 Gbps link as 10 times the weight of a 1 Gbps link, though, the former line may be only twice the weight of the latter, or any other similar scaling factor depending on display constraints.

Each device display area may also include one or more visual elements to show certain information pertaining to the device, such as user ID, configuration, performance, protection status, and so on. These additional elements may be provided as dialog boxes or visual icons, such as graphs or similar elements. As further shown in the example of FIG. 9, nested under each device is a graph 908 (e.g., a pie chart) that provides at-a-glance information such as success/warnings/failures of jobs (e.g., backup, restore, replication, etc.) related to devices connected to that network device.

The graph 908 can be coded so that it quickly provides visual indicators of relevant device and network parameters. For example, colors or cross-hatch patterns are used to indicate relative congestion of the device with the other connected devices. For example, a network with <=80% bandwidth used is green (or clear patterned), <=40% is yellow (or medium patterned), and <=20% is red (or dense patterned). All values are configurable, and alternate colors or patterns may be used. Each graphical icon can provide a link to further detailed textual information about the visual coding. As shown in FIG. 9, hovering over or selecting a given graph displays a pop-over window 910 with the actual numerical statistics for the jobs. Additionally, the pop-over window shows a health score for the device. The health score is generated using simple rules that factor the relevant configuration and job statistics. Scores can be compiled on factors such as software version, device age, sensor health, and so on, and can utilize additive or subtractive operations to derive an overall score. For example, the health score illustrated in item 910 may be derived by starting with 100 and subtracting 10 if the software version is not the latest, or subtracting 15 for each hardware sensor whose values are outside the proper range, and so on.

Because of inherent limitations of display devices along with the sheer size of typical networks, certain map scaling methods are used to provide a comprehensive yet easy to navigate visual mapping solution. Nested GUI layers may be used to provide different points of view, such that clicking on a particular device icon dynamically reloads the table to show the same view, but for the next level of devices. For example, clicking on "router 3" in the display 900 of FIG. 9 above would update the view to show only the devices in the Denver datacenter, including the switches connected to Router 3. This display would then leverage the information from the DP software's catalog, i.e., the other asset sources (e.g., VM hypervisors, DB servers, etc.) connected to those network devices. In a web-based implementation, the web browser state is correctly updated such that the user can use the browser's back button to return to the previous view after clicking through to a particular device. Other similar known GUI mechanisms may also be used, depending on system configuration and use.

As shown in FIG. 9, by default, the UI display 900 shows a Point-in-Time (PIT) view of the current device configuration, mapping, traffic, and other information. The user can change the PIT to one in the past by moving a slider 906 at the bottom of the screen. As the slider is moved, the date and time shown under the slider is updated. The current date can be translated to "Today" and one day earlier is translated to "Yesterday," whereas prior dates may show the full date, such as "12/25/21". The time and date format is configurable, as different locales may use different formats (e.g., "YY/MM/DD" in Europe vs. "MM/DD/YY" in the U.S.).

Certain data capture tools may also be used to provide continuum information rather than strict PIT representations. For example, snapshot and storage techniques can be used to provide playback of the network map 904 over time. From a given point-in-time (PIT), VCR-like interface buttons can be used to allow the user to initiate an animation through points in time sequentially in forward or reverse order. Clicking a FF/REW arrow (or similar) can toggle through a fixed set of speeds, such as 1×/3×/5×. By default, 1× speed shows each PIT for 5 seconds, such that a full day takes 2 minutes to watch. All such values provided for sake of example, only and are user or system configurable.

In an embodiment, the DPND collects information from routers and switches onto which it is installed, and saves that information to a file (e.g., in JSON format) along with the other backup data for the network device. Once that data is transported by the data protection software to the target storage, a process running within the data protection software can read and process the information and populate its internal database. For efficiency, the data protection software may use its existing database for monitoring and reporting, or a dedicated database such as a time-series database may be used. The UI service for the data protection software can then read that information to implement the UI, leveraging the existing frameworks and libraries used to render the rest of the UI, such as shown in display 900.

FIG. 10 is a table that shows information collected from DPND for use in the visual mapping GUI, under some embodiments. As shown in FIG. 10, table 950 comprises two columns, one for the information or sensor data that is collected from/for the devices, and their respective use in the user interface. The MAC address and display names are used to identify the devices for display to the user, such as 'router 1,' ' router 2' and so on in FIG. 9. The geographic location, such as determined by GPS coordinates or system defined tags or other location indicators provide the Lat/Long information that places each device in the network map 904. The network information, such as routes, routing, peers/neighbor, and VLAN information then determine the connections (links) among the devices. As shown in FIG. 9, the UI shows certain characteristics of the devices and interconnections through certain visual indicators or queues, such as device icon and connector link appearance. Thus, the remaining information items of table 950 dictate the appearance of the connecting lines and the health status indicator, as shown in FIG. 10. The information and use descriptions provided in table 950 are provided for purposes of example, and any other information and use in the UI are also possible.

In an embodiment, the network map 904 for the visual mapping GUI may comprise a single network or partition with one DPND process, such as shown in FIG. 2, or it may apply to a network having a number of different partitions.

Embodiments have been described for providing data protection for individual network devices. Such embodiments can be expanded to cover data protection across multiple network devices in a consistent manner. In this context, the term 'consistent' means synchronizing the protection state of these devices such that if network devices A and B are backed up, both would have data that would match each other, i.e., their data would be consistent with one another, so that during a restore, the fire all rules/data/etc. would work together. For example, a scenario in which firewall rules need to be applied to both devices, A and B, the backup should include a state where the rules are applied to both A and B or a state where none of the rules are applied.

Figure 11:
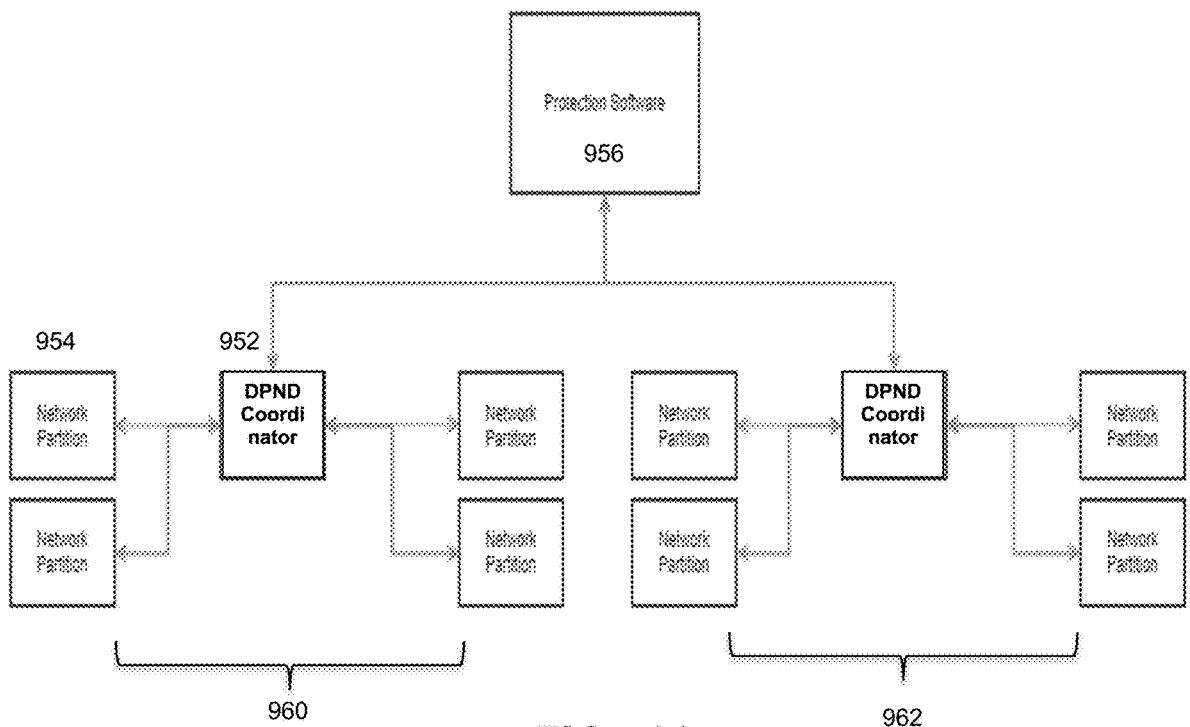
FIG. 11 illustrates different DPND coordinated partitions in a production software network, under some embodiments.

In a coordinated network, one or more network devices to be protected are grouped into respective partitions, and the data protection of devices within each partition are coordinated through a DPND coordinator component or function. A network partition is generally defined to be a series of network devices that are grouped together and communicate with a single DPND coordinator, where the DPND coordinator is a system component that will backup multiple network devices in a consistent state within a single network partition. A large distributed network system or environment may comprise several partitions in regions or super-partitions, each of which may be synchronized by their own DPND coordinators. FIG. 11 illustrates different DPND coordinated partitions in a production software network, under some embodiments. As shown in FIG. 11, two different regions 960 and 962 are shown with each having its own DPND coordinator 962 and 964 coupled to respective network partitions 954. Each partition 954 can comprise any number of individual network devices. The protection storage software 956 interacts with each DPDN coordinator 952, which in turn acts on a partition 954 that has a DPND process. The example of FIG. 11 shows DPND coordinators 952 that are controlled by protection software such as Avamar or PowerProtect Data Manager. A single instance of protection software 956 can control any number of DPND coordinators as shown. The DPND coordinator will create a backup of each network device in a consistent state within each network partition controlled by the coordinator. For purposes of example, FIG. 11 shows a network with two DPND coordinators and a number of different network partitions. Any appropriate number of partitions may be provided and a network of any scale or complexity can comprise the network map 904 for the visual mapping GUI process 116.

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 12:
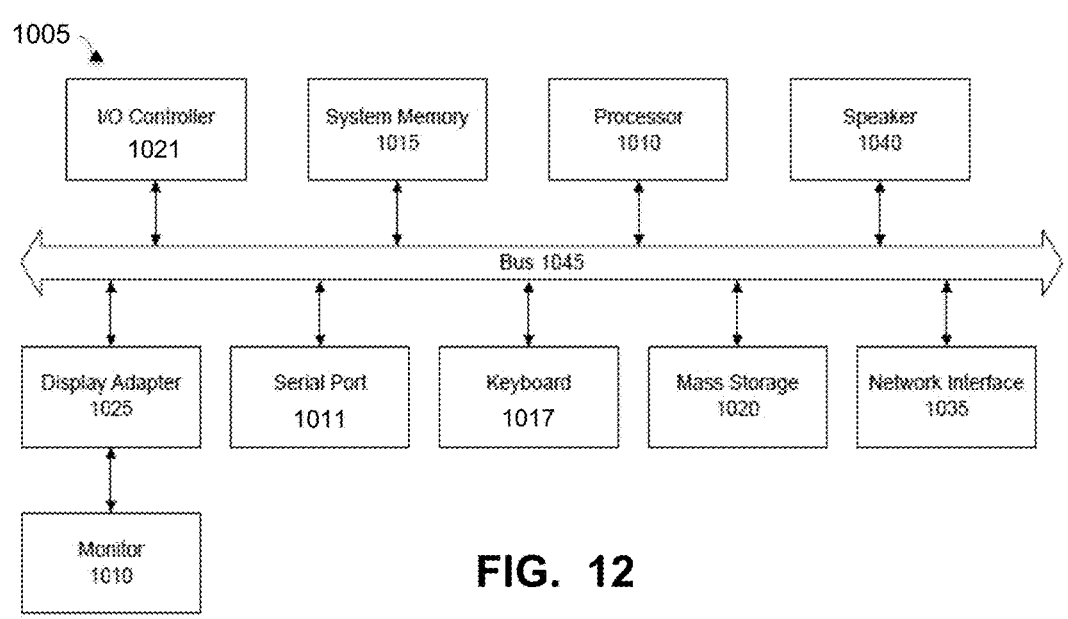
FIG. 12 is a system block diagram of a computer system used to execute one or more software components of the data protection networking device process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 12 shows a system block diagram of a computer system used to execute one or more software components of the systems and methods described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing data protection for a plurality of partitioned network equipment devices, comprising:
   creating a backup of each network device in a system, wherein the backup is performed by backup software connected to a data protection network device (DPND) coordinator;
   pushing, from the DPND coordinator, one or more backup policies to individual DPND units for the network devices within the partition to provide a consistent-state backup of the network devices for backup of the configuration changes of the network devices to a protection storage device;
   determining a location, a protection status, a connectivity characteristic, and a health status of each device in the system; and
   displaying, in a visual mapping graphical user interface (GUI), an icon for each device relative to other devices based on the respective device location, a visual characteristic of the icon for each device based on a respective protection status, a connector from the icon to other connected devices based on the respective device connectivity characteristic, and a health indicator for each device based on a respective health status.

2. The method of claim 1 wherein the GUI comprises a two-dimensional table indicating latitude and longitude information for each device, and further wherein the rows of the table provide the latitude information and the columns of the table provide the longitude information.

3. The method of claim 1 wherein the protection status for each device indicates whether the device has been fully, partially, or not backed up by the created backup operation, and further wherein the visual characteristic of the icon comprises one of a color of the icon, a shading pattern of the icon, or a shape of the icon.

4. The method of claim 2 wherein connections between directly or indirectly coupled devices are shown through line connectors.

5. The method of claim 4 wherein the connections are determined through at least one of static routing information, dynamic routing information, peers and neighbor information, and VLAN information for each device relative to the other devices.

6. The method of claim 5 wherein each connector from the device to the other devices is displayed to reflect the device connectivity characteristic through a visual representation of the connector, and further wherein the device connectivity characteristic comprises at least one of a link speed, maximum transmission unit (MTU), device latency, and device bandwidth.

7. The method of claim 6 wherein the visual representation of the connector comprises at least one of a line thickness, color, or pattern.

8. The method of claim 1 wherein the respective health status is provided as a percentage metric derived from factors including: software version, device age, and sensor health.

9. The method of claim 8 wherein the respective health status is displayed in a text window associated with the respective device icon.

10. The method of claim 1 wherein the GUI display shows a Point-in-Time (PIT) view of the current device configuration, backup status, topographic mapping, and connectivity, and wherein the GUI includes a mechanism allowing a user to change the PIT along a time continuum to a point in the past.

11. The method of claim 1 wherein each device icon represents a plurality of devices in a location, and wherein the GUI includes nested GUI layers to provide different points of view, such that selecting on a first device icon dynamically reloads the table to show a network map view a next level of devices.

12. The method of claim 1 wherein the data protection comprises protection software executed in a production software system, and each device represented by an icon comprises an out-of-band device coupled to other network equipment devices through a network implementing out-of-band protocols, and wherein the network equipment device is an interface device comprising one of: a managed switch, a router, a firewall, and a buffer.

13. A computer-implemented method of indicating a data protection status for a network of devices, comprising:
   determining a location, a protection status, a connectivity characteristic, and a health status of each device in the system;
   constructing a two-dimensional table indicating latitude and longitude information for each device, wherein the rows of the table provide the latitude information and the columns of the table provide the longitude information; and displaying, in a visual mapping graphical user interface (GUI) and through the table, an icon for each device relative to other devices based on the respective device location, a visual characteristic of the icon for each device based on a respective protection status, a connector from the icon to other connected devices based on the respective device connectivity characteristic, and a health indicator for each device based on a respective health status.

14. The method of claim 13 wherein the protection status for each device indicates whether the device has been fully, partially, or not backed up by the created backup operation, and further wherein the visual characteristic of the icon comprises one of a color of the icon, a shading pattern of the icon, or a shape of the icon.

15. The method of claim 13 wherein connections between directly or indirectly coupled devices are shown through line connectors, and wherein the connections are determined through at least one of static routing information, dynamic routing information, peers and neighbor information, and VLAN information for each device relative to the other devices, and yet further wherein each connector from the device to the other devices is displayed to reflect the device connectivity characteristic through a visual representation of a line thickness, color or pattern of the connector, and further wherein the device connectivity characteristic comprises at least one of a link speed, maximum transmission unit (MTU), device latency, and device bandwidth.

16. The method of claim 13 wherein the respective health status is provided as a percentage metric derived from factors including: software version, device age, and sensor health, and further wherein the respective health status is displayed in a text window associated with the respective device icon.

17. The method of claim 13 wherein the GUI display shows a Point-in-Time (PIT) view of the current device configuration, backup status, topographic mapping, and connectivity, and wherein the GUI includes a mechanism allowing a user to change the PIT along a time continuum to a point in the past.

18. The method of claim 13 wherein each device icon represents a plurality of devices in a location, and wherein the GUI includes nested GUI layers to provide different points of view, such that selecting on a first device icon dynamically reloads the table to show a network map view a next level of devices.

19. The method of claim 13 wherein the data protection comprises protection software executed in a production software system, and each device represented by an icon comprises an out-of-band device coupled to other network equipment devices through a network implementing out-of-band protocols, and wherein the network equipment device is an interface device comprising one of: a managed switch, a router, a firewall, and a buffer, the method further comprising:
creating a backup of each network device in a system, wherein the backup is performed by backup software connected to a data protection network device (DPND) coordinator; and
pushing, from the DPND coordinator, one or more backup policies to individual DPND units for the network devices within the partition to provide a consistent-state backup of the network devices for backup of the configuration changes of the network devices to a protection storage device.

20. A system for indicating a data protection status for a network of devices, comprising:
a processor-based component determining a location, a protection status, a connectivity characteristic, and a health status of each device in the system;
a database accessible by the component and storing a two-dimensional table indicating latitude and longitude information for each device, wherein the rows of the table provide the latitude information and the columns of the table provide the longitude information; and
a graphical user interface (GUI) displaying, through the table, an icon for each device relative to other devices based on the respective device location, a visual characteristic of the icon for each device based on a respective protection status, a connector from the icon to other connected devices based on the respective device connectivity characteristic, and a health indicator for each device based on a respective health status, wherein the protection status for each device indicates whether the device has been fully, partially, or not backed up by the created backup operation, and further wherein the visual characteristic of the icon comprises one of a color of the icon, a shading pattern of the icon, or a shape of the icon.

* * * * *